(No Model.) 2 Sheets—Sheet 2.

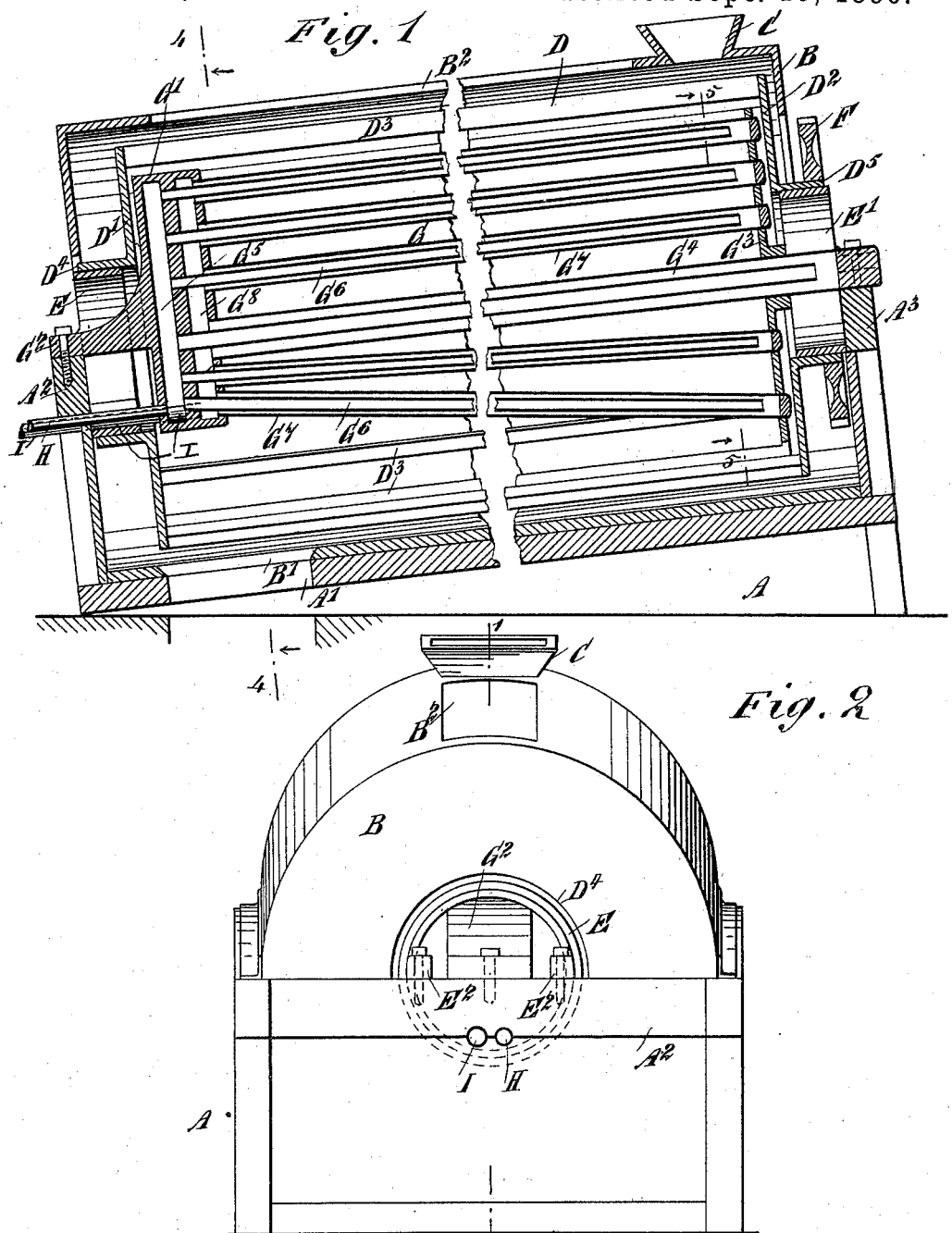

H. CUTLER.
STEAM DRYING MACHINE.

No. 567,887. Patented Sept. 15, 1896.

WITNESSES:
C. Neveux
Geo. J. Hosted

INVENTOR
H. Cutler
BY Munn & Co
ATTORNEYS.

UNITED STATES PATENT OFFICE.

HENRY CUTLER, OF WILBRAHAM, MASSACHUSETTS, ASSIGNOR TO THE CUTLER COMPANY, OF SAME PLACE.

STEAM DRYING-MACHINE.

SPECIFICATION forming part of Letters Patent No. 567,887, dated September 15, 1896.

Application filed December 2, 1895. Serial No. 570,835. (No model.)

*To all whom it may concern:*

Be it known that I, HENRY CUTLER, of (North) Wilbraham, in the county of Hampden and State of Massachusetts, have invented a new and Improved Steam Drying-Machine, of which the following is a full, clear, and exact description.

The invention relates to grain-driers, such as shown and described in the Letters Patent of the United States, No. 269,644, granted to me December 26, 1882.

The object of the present invention is to provide a new and improved drying-machine for drying grain and other material, and which is simple and durable in construction, very effective in operation, not liable to get clogged or out of order, and arranged to prevent leakage and freezing.

The invention consists principally of a stationary casing having an inlet and outlet for the material to be dried, a bucket-frame revolving within said casing, and a bundle of steam-pipes held stationary within said frame.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 3:
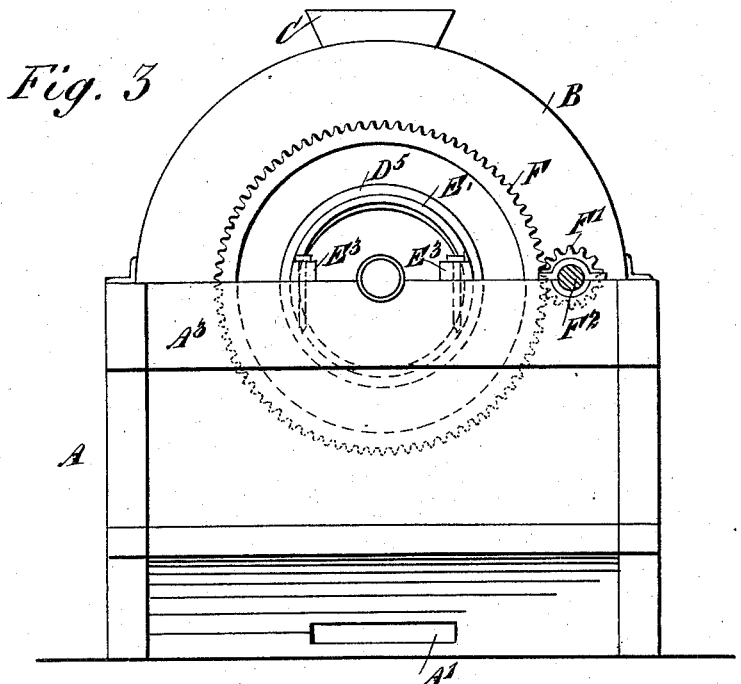
Figure 4:
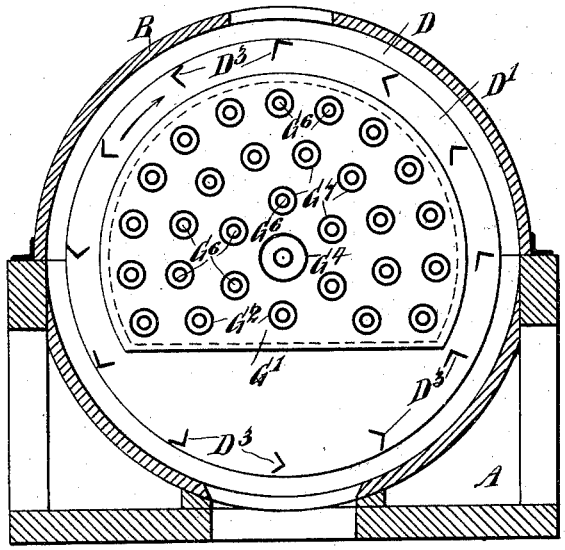
Figure 5:
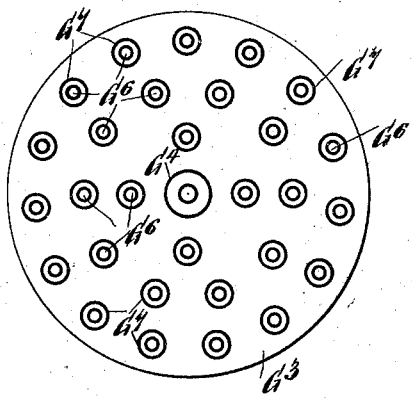

Figure 1 is a longitudinal sectional elevation of the improvement on the line 1 1 of Fig. 2. Fig. 2 is an end view of the same. Fig. 3 is a like view of the other end of the same. Fig. 4 is a cross-section of the same on the line 4 4 of Fig. 1, and Fig. 5 is a cross-section of the bundle of steam-pipes on the line 5 5 of Fig. 1.

The improved steam drying-machine is mounted on a suitably-constructed frame A, on which is secured a cylindrical casing B, held in an inclined position, as is plainly indicated in Fig. 1, and provided on the top and near the upper end with a hopper C, through which the grain or other material to be dried is introduced into the casing. In the bottom of the casing and near the lower end thereof is formed an outlet-opening B', registering with an opening A', formed in the inclined bottom board of the frame A. The grain, after drying, passes out through the registering openings B' and A'.

Within the casing B is mounted to revolve a bucket-frame D, provided with heads D' and $D^2$, connected with each other by the buckets $D^3$, made V-shaped in cross-section and standing at different angles one to the other, as plainly indicated in Fig. 4, so that said buckets discharge the grain at different points and near the top of the casing, as hereinafter more fully described.

The lower head D' is formed with an outwardly-extending hub $D^4$, mounted to turn on a cylindrical or collar bearing E, provided with inwardly-extending lugs $E^2$, secured by bolts to a cross-timber $A^2$ of the frame A. (See Fig. 2.) The upper head $D^2$ of the revolving bucket-frame is likewise provided with a hub $D^5$, mounted to turn on a cylindrical or collar bearing E', having inwardly-projecting lugs $E^3$, secured by bolts or other means to the cross-timber $A^3$, arranged on the upper end of the frame A. On the hub $D^5$ is secured a gear-wheel F, in mesh with a pinion F', secured on a driving-shaft $F^2$, connected with suitable machinery for imparting a rotary motion to said shaft $F^2$ to cause the pinion F' to turn the gear-wheel F, and consequently revolve the bucket-frame D within the casing B.

Within the bucket-frame D is arranged a bundle of steam-pipes G, supported at their lower ends in a steam-chamber G', arranged near the head D' and provided with an outwardly-extending lug $G^2$, bolted to the cross-timber $A^2$ of the frame, said lug extending through the cylindrical or collar bearing E, as is plainly shown in Fig. 1. The upper ends of the bundles of pipes G are supported on a head $G^3$, arranged close to the head $D^2$ and secured on a central pipe $G^4$, extending through the collar-bearing E', to be attached at its outer end to the cross-timber $A^3$.

The steam-chamber G' is provided with a steam-inlet $G^5$, into which leads a steam-supply pipe H, connected with a suitable source of steam supply. From this chamber $G^5$ extend the pipes $G^6$ within the pipes $G^7$, fastened at their upper ends to the head $G^3$ and at their lower ends to the inner wall of the steam-chamber G', said pipes opening into a discharge-chamber $G^8$, formed in said chamber $G'$. A pipe I leads from this chamber $G^8$ to carry off the water of condensation. Both pipes H and I extend through the cylindrical or collar bearing E, as is plainly shown in Figs. 1 and 2. Now by reference to Fig. 2 it will be seen that the pipes $G^6$ terminate at their outer ends within a short distance of the outer closed ends of the pipes $G^7$, so that the steam from the chamber $G'$, passing through the pipes $G^6$, finally issues into the pipes $G^7$, to travel back therein to the chamber $G^8$, from which the water of condensation of the steam is carried off by the pipe I. By reference to Figs. 1 and 4 it will be seen that the steam-chamber $G'$ terminates with its lower end close to the bottom of the collar E to bring the pipes H and I as low down as possible and permit of discharging all the water of condensation from the chamber $G^8$. The upper head $G^3$ for the bundle of pipes G is considerably larger than the steam-chamber $G'$, so that the pipes $G^6$ and $G^7$ are spread outwardly from the steam-chamber $G'$ to the said head $G^3$, and consequently the pipes $G^7$ are farther apart at the upper end of the casing than near the steam-chamber $G'$. This arrangement is very serviceable, as the grain entering at the upper end of the casing B needs more room, owing to its moist condition, than it requires at the lower end of the casing at the time the grain is dry. The top of the casing B is provided with a longitudinal slot $B^2$ for the escape of the steam constantly arising from the grain or other material undergoing treatment in the casing.

The operation is as follows: The grain or other material to be dried is passed through the hopper C into the upper end of the casing B and taken up by the buckets $D^3$, to be carried around within the casing and discharged at different points into the bundle of steam-pipes G to insure a proper drying of the grain, the latter falling over the pipes downward, to be again taken up by the buckets and carried upward and discharged over the bundle of pipes. Now, as the bucket-frame and casing are in an inclined position, the grain is gradually carried in a downward direction, and when dried is finally discharged through the registering openings $A'$ and $B'$.

It will be seen that by the arrangement described the steam pipes and chamber $G'$ remain stationary, and consequently leakage at this point is not liable to occur. Furthermore, the water of condensation in the chamber $G^8$ is at all times perfectly drained off by gravity to prevent freezing of the machine in cold weather. The moving parts run in oiled bearings to reduce the friction to a minimum, and as the said bearings are removed from the heated parts the oil is not liable to dry up or evaporate.

Having thus fully described my invention, I claim as new and desire to secure by Letters Patent—

1. A steam drying-machine, comprising a stationary casing, a bucket-frame revolving therein, and a bundle of steam-pipes held stationary within the bucket-frame, substantially as shown and described.

2. A steam drying-machine, comprising a stationary casing held in an inclined position and provided with an inlet and an outlet for the material to be dried, and an inclined bucket-frame arranged to revolve within the said casing, and a bundle of steam-pipes held stationary within said bucket-frame, substantially as shown and described.

3. A steam drying-machine, provided with a bucket-frame having longitudinally-extending V-shaped buckets set at different angles, substantially as shown and described.

4. A steam drying-machine, provided with a stationary casing having an inlet and an outlet for the material to be dried, fixed collar-bearings at the ends of said casing, a bucket-frame within said casing and provided on its heads with hubs mounted to turn on said collar-bearings, and a bundle of pipes arranged within said bucket-frame and supported with said collar-bearings on the frame of the machine, substantially as shown and described.

5. A steam drying-machine, provided with a bundle of steam-pipes having a steam-chamber provided with a lug for supporting said chamber, substantially as shown and described.

6. A steam drying-machine, provided with a bundle of pipes comprising pipes proper, a steam-chamber supporting one end of the pipes, a head supporting the other end of the pipes, a lug projecting from the steam-chamber, and a central pipe attached to the steam-chamber and supporting at its other end said head, substantially as shown and described.

7. In a steam drying-machine, the combination with a fixed collar-bearing, of a steam-chamber having a lug extending through said bearing, and supply and drain pipes for said steam-chamber and extending through said collar-bearing, substantially as shown and described.

8. In a steam drying-machine, the combination with collar-bearings, of a revolving bucket-frame having hubs mounted to turn on said bearings, and a bundle of pipes provided with a head and a steam-chamber, of which the latter is provided with a lug extending through one collar-bearing, said head being supported on a central pipe extending through the other collar-bearing, substantially as shown and described.

HENRY CUTLER.

Witnesses:
H. A. KING,
R. J. SACKETT.